US005709373A

United States Patent [19]

Wasylynko

[11] Patent Number: 5,709,373
[45] Date of Patent: Jan. 20, 1998

[54] PORTABLE SKI AND SNOWBOARD TUNING TABLE

[76] Inventor: David E. Wasylynko, 1877 Laronde Drive, Surrey British Columbia, Canada, U4A 9M9

[21] Appl. No.: 567,115

[22] Filed: Dec. 4, 1995

[51] Int. Cl.$^{6}$ ..................... B23Q 1/04

[52] U.S. Cl. ..................... 269/16; 269/69; 269/76; 269/71; 269/296; 269/906; 269/901

[58] Field of Search ..................... 108/127; 269/69, 269/71, 45, 296, 16, 76, 906, 901

[56] References Cited

U.S. PATENT DOCUMENTS

| | | | |
|---|---|---|---|
| 868,966 | 10/1907 | Chase | 269/45 |
| 1,313,061 | 8/1919 | Brown | 269/45 |
| 1,479,209 | 1/1924 | Topp | 269/901 |
| 4,548,392 | 10/1985 | Rickling | 269/901 |
| 4,579,322 | 4/1986 | Schwarz | 269/70 |
| 4,949,944 | 8/1990 | Graff | 269/45 |
| 4,991,325 | 2/1991 | Tedushi | 208/127 |

*Primary Examiner*—Robert C. Watson

[57] ABSTRACT

A portable ski and snowboard tuning table comprised of a horizontal support bar. A pair of legs are hingedly secured to opposing ends of the horizontal support bar. A pair of stabilizers of slidably secured to the horizontal support bar. A pair of vices are slidably secured to the horizontal support bar inwardly of the pair of stabilizers.

2 Claims, 3 Drawing Sheets

PORTABLE SKI AND SNOWBOARD TUNING TABLE

BACKGROUND OF THE INVENTION

1. Field of the Invention

The present invention relates to a portable ski and snowboard tuning table and more particularly pertains to allowing a user to tune a pair of skis or a snowboard in any location with a portable ski and snowboard tuning table.

2. Description of the Prior Art

The use of ski tuning devices is known in the prior art. More specifically, ski tuning devices heretofore devised and utilized for the purpose of tuning up skis are known to consist basically of familiar, expected and obvious structural configurations, notwithstanding the myriad of designs encompassed by the crowded prior art which have been developed for the fulfillment of countless objectives and requirements.

By way of example, U.S. Pat. No. 5,150,887 to Weissenborn et al. discloses a ski holding device.

U.S. Pat. No. 4,679,356 to Thomas discloses an automatic ski tuning device.

U.S. Pat. No. 4,601,220 to Yurick, Jr. discloses a ski edge tuning tool.

U.S. Pat. No. 4,557,030 to Gaston et al. discloses a multipurpose apparatus and method for tuning and grooving a ski.

U.S. Pat. No. 3,834,250 to Fonas discloses a method and apparatus for tuning a pair of skis.

While these devices fulfill their respective, particular objective and requirements, the aforementioned patents do not describe a portable ski and snowboard tuning table for allowing a user to tune a pair of skis or a snowboard in any location.

In this respect, the portable ski and snowboard tuning table according to the present invention substantially departs from the conventional concepts and designs of the prior art, and in doing so provides an apparatus primarily developed for the purpose of allowing a user to tune a pair of skis or a snowboard in any location.

Therefore, it can be appreciated that there exists a continuing need for new and improved portable ski and snowboard tuning table which can be used for allowing a user to tune a pair of skis or a snowboard in any location. In this regard, the present invention substantially fulfills this need.

SUMMARY OF THE INVENTION

In the view of the foregoing disadvantages inherent in the known types of ski tuning devices now present in the prior art, the present invention provides an improved portable ski and snowboard tuning table. As such, the general purpose of the present invention, which will be described subsequently in greater detail, is to provide a new and improved portable ski and snowboard tuning table and method which has all the advantages of the prior art and none of the disadvantages.

To attain this, the present invention essentially comprises a horizontal support bar having a first extent and a second extent. The first extent is telescopically received within the second extent. The second extent has a wing nut and bolt extending therethrough to removably couple the second extent to the first extent. The device contains a pair of legs. Each of the legs has an upper portion and a lower portion. Each upper portion is hingedly secured to opposing ends of the horizontal support bar at a proximal end thereof. Each upper portion has a spring biased male detent element secured within a distal end thereof. Each lower portion has an aperture formed through a proximal end thereof and rubber feet secured to a distal end thereof. Each lower portion telescopically receives a corresponding upper portion therein with the spring biased male detent element cooperating with the aperture thereof to secure the lower portion to the upper portion. The device contains a pair of stabilizers. Each of the stabilizers has a securement bracket slidably secured to the horizontal support bar. Each securement bracket has a tightening screw to tightly secure the stabilizers to the horizontal support bar. Each securement bracket has a threaded rod extending upwardly therefrom. Each threaded rod has a T-shaped bar adjustably coupled thereto. An upper portion of the T-shaped bar has a rubber layer disposed thereon. The device contains a pair of vices. Each of the vices has a securement bracket slidably secured to the horizontal support bar inwardly of the pair of stabilizers. Each securement bracket has a tightening screw to tightly secure the vices to the horizontal support bar. Each securement bracket has a threaded rod extending upwardly therefrom. Each threaded rod has a spring biased clamp secured thereto. Each spring biased clamp has an adjustable vice removably coupled thereto. Each adjustable vice has a rubber protective tip on end portions thereof. The device contains a carrying case adapted to hold the tuning table therein when in a collapsed configuration. The carrying case has a plurality of pockets disposed thereon to carry wax and ski tuning tools therein.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new and improved portable ski and snowboard tuning table which has all the advantages of the prior art ski tuning devices and none of the disadvantages.

It is another object of the present invention to provide a new and improved portable ski and snowboard tuning table which may be easily and efficiently manufactured and marketed.

It is a further object of the present invention to provide a new and improved portable ski and snowboard tuning table which is of durable and reliable construction.

An even further object of the present invention is to provide a new and improved portable ski and snowboard tuning table which is susceptible of a low cost of manufacture with regard to both materials and labor, and which accordingly is then susceptible of low prices of sale to the consuming public, thereby making such a portable ski and snowboard tuning table economically available to the buying public.

Still yet another object of the present invention is to provide a new and improved portable ski and snowboard tuning table which provides in the apparatuses and methods of the prior art some of the advantages thereof, while simultaneously overcoming some of the disadvantages normally associated therewith.

Even still another object of the present invention is to provide a new and improved portable ski and snowboard tuning table for allowing a user to tune a pair of skis or a snowboard in any location.

Lastly, it is an object of the present invention to provide a new and improved portable ski and snowboard tuning table comprised of a horizontal support bar. A pair of legs are hingedly secured to opposing ends of the horizontal support bar. A pair of stabilizers of slidably secured to the horizontal support bar. A pair of vices are slidably secured to the horizontal support bar inwardly of the pair of stabilizers.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

The same reference numerals refer to the same parts through the various Figures.

DESCRIPTION OF THE PREFERRED EMBODIMENT

Figures 1, 2, 3:
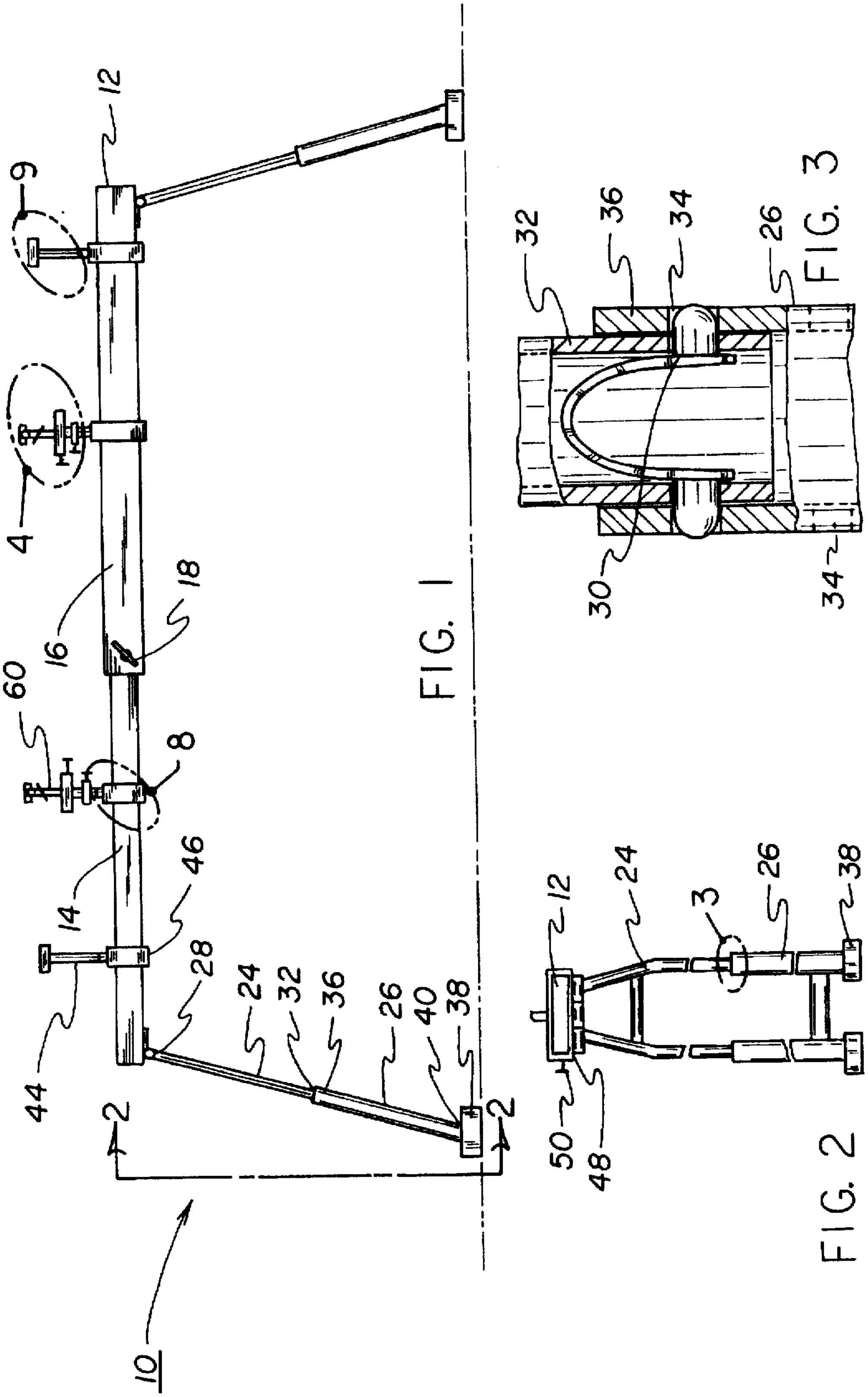
FIG. 1 is a front view of the preferred embodiment of the portable ski and snowboard tuning table constructed in accordance with the principles of the present invention.
FIG. 2 is a cross-sectional view as taken along line 2—2 of FIG. 1.
FIG. 3 is a fragmentary view of the telescoping legs as illustrated in FIG. 2.
Figure 4:
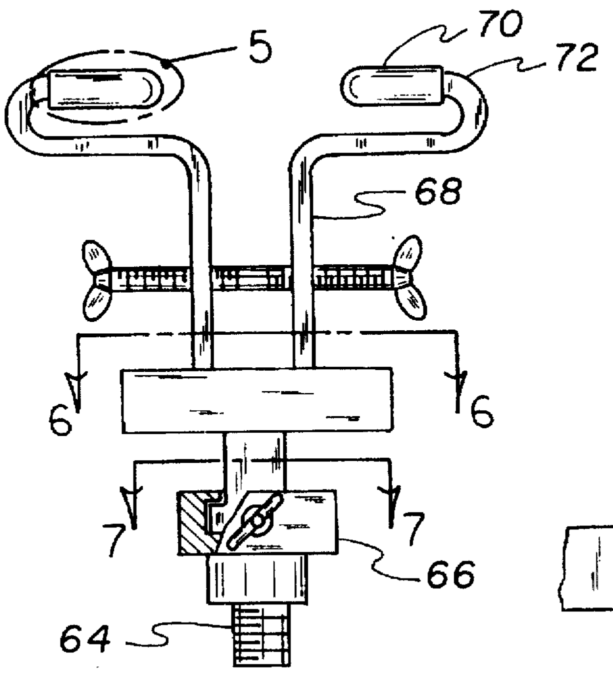
FIG. 4 is a front view of one of the vices of the present invention.
Figure 5:
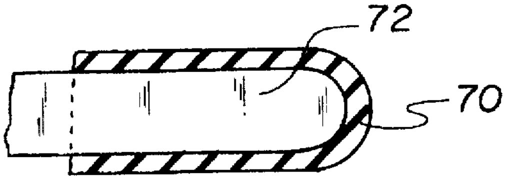
FIG. 5 is a fragmentary view of a rubber tip of the vice.
Figure 6:
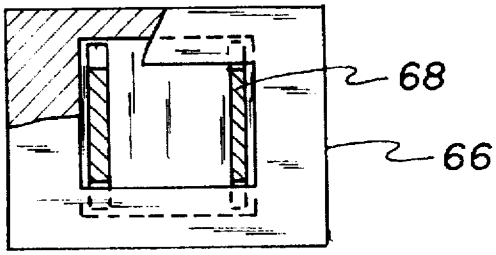
FIG. 6 is a cross-sectional view as taken along line 6—6 of FIG. 4.
Figure 7:
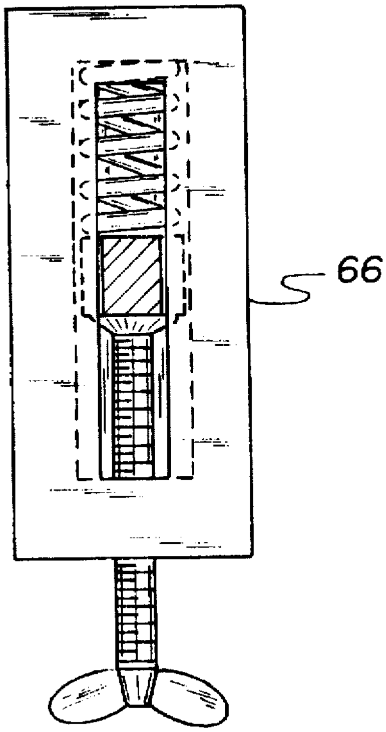
FIG. 7 is a cross-sectional view as taken along line 7—7 of FIG. 4.
Figure 8:
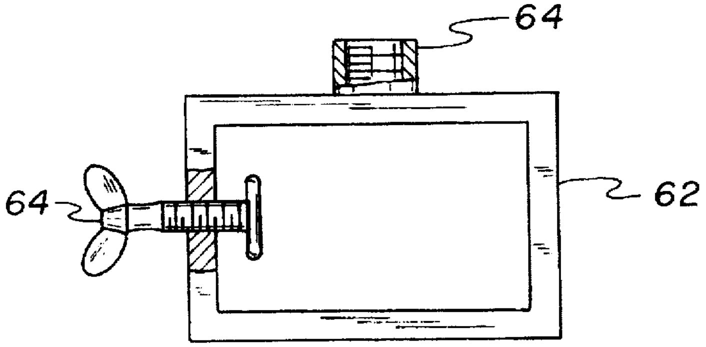
FIG. 8 is a front view of a lower portion of one of the clamps of the present invention.
Figure 9:
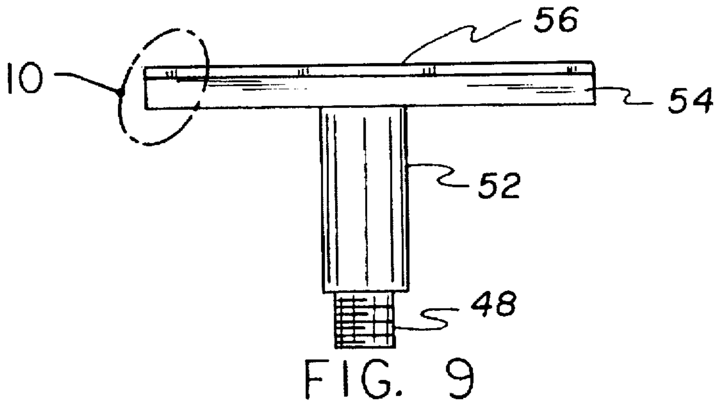
FIG. 9 is a front view of one of the stabilizers of the present invention.
Figure 10:
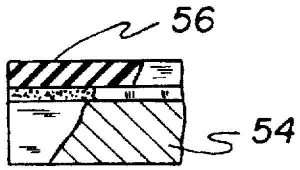
FIG. 10 is a fragmentary view of a rubber tip of the stabilizer of the present invention.
Figure 11:
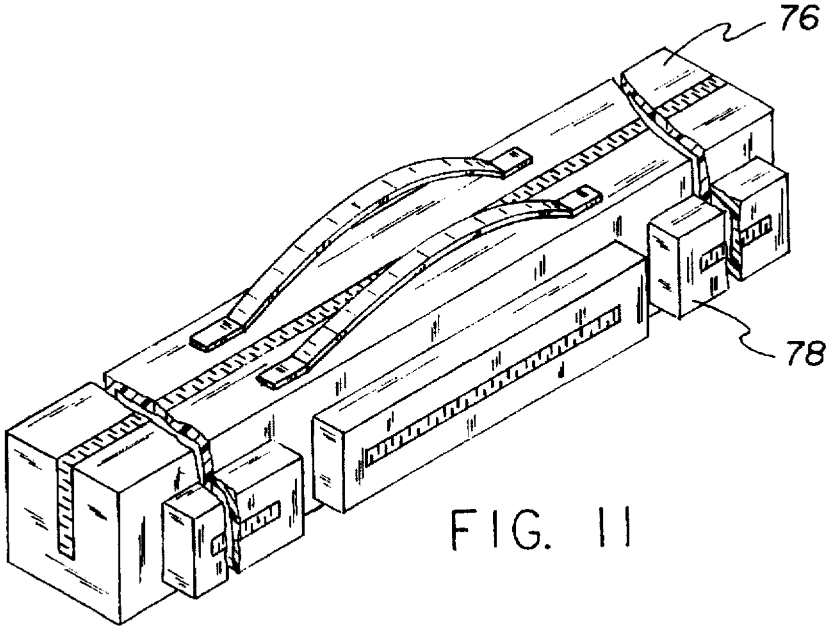
FIG. 11 is a perspective view of the carrying case of the present invention.

With reference now to the drawings, and in particular, to FIG. 1 thereof, the preferred embodiment of the new and improved portable ski and snowboard tuning table embodying the principles and concepts of the present invention and generally designated by the reference number 10 will be described.

Specifically, it will be noted in the various Figures that the device relates to a new and improved portable ski and snowboard tuning table for allowing a user to tune a pair of skis or a snowboard in any location. In its broadest context, the device consists of a horizontal support bar, a pair of legs, a pair of stabilizers, a pair of vices, and a carrying case. Such components are individually configured and correlated with respect to each other so as to attain the desired objective.

The first component of the device 10 is a horizontal support bar 12. The horizontal support bar 12 has a first extent 14 and a second extent 16. The first extent 14 is telescopically received within the second extent 16. The second extent 16 has a wing nut and bolt 18 extending therethrough to removably couple the second extent 16 to the first extent 14. The first extent 14 and the second extent 16 are of identical lengths. The horizontal support bar 12 can be extended from a minimum of twenty-four inches to a maximum of forty-eight inches.

The second component of the device 10 is a pair of legs 22. Each of the legs 22 has an upper portion 24 and a lower portion 26. Each upper portion 24 is hingedly secured to opposing ends of the horizontal support bar 12 at a proximal end 28 thereof. Each upper portion 24 has a spring biased male detent element 30 secured within a distal end 32 thereof. Each lower portion 26 has an aperture 34 formed through a proximal end 36 thereof and rubber feet 38 secured to a distal end 40 thereof. Each lower portion 26 telescopically receives a corresponding upper portion 24 therein with the spring biased male detent element 30 cooperating with the aperture 34 thereof to secure the lower portion 26 to the upper portion 24. Each lower portion can be constructed with a plurality of apertures 34 to allow the height of the legs 22 to be adjusted. The legs 22 should be allowed to adjust from ten inches to thirty-six inches. Each of the legs 22 can be folded against the horizontal support bar 12 for the device 10 to be easily transported.

The third component of device 10 is a pair of stabilizers 44. Each of the stabilizers 44 has a securement bracket 46 slidably secured to the horizontal support bar 12. Each securement bracket 46 has a tightening screw 48 to tightly secure the stabilizers 44 to the horizontal support bar 12. Each securement bracket 46 has a threaded rod 50 extending upwardly therefrom. Each threaded rod 50 has a T-shaped bar 52 adjustably coupled thereto. An upper portion 54 of the T-shaped bar 52 has a rubber layer 56 disposed thereon. Each of the stabilizers 44 is used to balance skis that are being tuned. Each of the stabilizers 44 has a width of about eight inches. The rubber layer 56 protects the skis or snowboard from being scratched or dented.

The fourth component of the device 10 is a pair of vices 60. Each of the vices 60 has a securement bracket 62 slidably secured to the horizontal support bar 12 inwardly of the pair of stabilizers 44. Each securement bracket 62 has a tightening screw 64 to tightly secure the vices 60 to the horizontal support bar 12. Each securement bracket 62 has a threaded rod 64 extending upwardly therefrom. Each threaded rod 64 has a spring biased clamp 66 secured thereto. Each spring biased clamp 66 has an adjustable vice 68 removably coupled thereto. Each adjustable vice 68 has a rubber protective tip 70 on end portions 72 thereof. Each of the vices 60 is used to secure a ski or snowboard horizontally so that wax can be applied or that edges, of the skis, can be sharpened.

The final component of the device 10 is a carrying case 76. The carrying case 76 is adapted to hold the tuning table therein when in a collapsed configuration. The carrying case 76 has a plurality of pockets 78 disposed thereon to carry wax and ski tuning tools therein.

As to the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and the manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modification and changes will readily occur to those skilled in the art, it is not desired to limit the invention to the exact construction and operation shown and described, and accordingly, all suitable modification and equivalents may be resorted to, falling within the scope of the invention.

What is claimed as being new and desired to be protected by Letters Patent of the United States is as follows:

1. A portable ski and snowboard tuning table for allowing a user to tune a pair of skis or a snowboard in any location comprising, in combination:

a horizontal support bar having a first extent and a second extent, the first extent being telescopically received within the second extent, the second extent having a wing nut and bolt extending therethrough to removably couple the second extent to the first extent;

a pair of legs, each of the legs having an upper portion and a lower portion, each upper portion hingedly secured to opposing ends of the horizontal support bar at a proximal end thereof, each upper portion having a spring biased male detent element secured within a distal end thereof, each lower portion having an aperture formed through a proximal end thereof and rubber feet secured to a distal end thereof, each lower portion telescopically receiving a corresponding upper portion therein with the spring biased male detent element cooperating with the aperture thereof to secure the lower portion to the upper portion;

a pair of stabilizers, each of the stabilizers having a securement bracket slidably secured to the horizontal support bar, each securement bracket having a tightening screw to tightly secure the stabilizers to the horizontal support bar, each securement bracket having a threaded rod extending upwardly therefrom, each threaded rod having a T-shaped bar adjustably coupled thereto, an upper portion of the T-shaped bar having a rubber layer disposed thereon;

a pair of vices, each of the vices having a securement bracket slidably secured to the horizontal support bar inwardly of the pair of stabilizers, each securement bracket having a tightening screw to tightly secure the vices to the horizontal support bar, each securement bracket having a threaded rod extending upwardly therefrom, each threaded rod having a spring biased clamp secured thereto, each spring biased clamp having an adjustable vice removably coupled thereto, each adjustable vice having a rubber protective tip on end portions thereof;

a carrying case adapted to hold the tuning table therein when in a collapsed configuration, the carrying case having a plurality of pockets disposed thereon to carry wax and ski tuning tools therein.

2. A portable ski and snowboard tuning table for allowing a user to tune a pair of skis or a snowboard in any location comprising, in combination:

a horizontal support bar;

a pair of legs, each of the legs hingedly secured to opposing ends of the horizontal support bar;

a pair of stabilizers slidably secured to the horizontal support, the stabilizers being positionable on opposing ends of a ski or the like;

a pair of vices slidably secured to the horizontal support bar inwardly of the pair of stabilizers, the vices being spaced sufficiently so as to accommodate the ski or the like, each of the vices having a securement bracket slidably secured to the horizontal support bar inwardly of the pair of stabilizers, each securement bracket having a tightening screw to tightly secure the vices to the horizontal support bar, each securement bracket having a threaded rod extending upwardly therefrom, each threaded rod having a spring biased clamp secured thereto, each spring biased clamp having an adjustable vice removably coupled thereto, each adjustable vice having a rubber protective tip end portions thereof.

* * * * *